United States Patent [19]
Allen et al.

[11] Patent Number: 5,849,944
[45] Date of Patent: *Dec. 15, 1998

[54] POLYURETHANE ELASTOMERS HAVING IMPROVED GREEN STRENGTH AND DEMOLD TIME, AND POLYOXYALKYLENE POLYOLS SUITABLE FOR THEIR PREPARATION

[75] Inventors: Gary L. Allen, Winfield; Nigel Barksby, Dunbar; Stephen D. Seneker, Sissonville, all of W. Va.; Usama E. Younes, West Chester, Pa.

[73] Assignee: ARCO Chemical Technology, L.P., Greenville, Del.

[*] Notice: The term of this patent shall not extend beyond the expiration date of Pat. No. 5,677,413.

[21] Appl. No.: 863,264

[22] Filed: May 27, 1997

Related U.S. Application Data

[62] Division of Ser. No. 491,007, Jun. 15, 1995, Pat. No. 5,670,601.

[51] Int. Cl.$^6$ .......... C07C 271/08; C08G 18/10; C08G 18/12
[52] U.S. Cl. .......... 560/26; 252/182.22; 528/59; 528/76; 528/77; 560/25; 560/115; 560/158; 560/330; 560/355; 560/358
[58] Field of Search .......... 252/182.22; 528/76, 528/77, 59; 560/25, 26, 115, 158, 330, 355, 358

[56] References Cited

U.S. PATENT DOCUMENTS

| | | | |
|---|---|---|---|
| 4,239,879 | 12/1980 | Fabris et al. | 528/76 |
| 5,096,993 | 3/1992 | Smith et al. | 528/61 |
| 5,100,922 | 3/1992 | Wada et al. | 521/51 |
| 5,100,997 | 3/1992 | Reisch et al. | 528/60 |
| 5,106,874 | 4/1992 | Porter et al. | 528/64 |
| 5,116,931 | 5/1992 | Reisch et al. | 528/59 |
| 5,124,425 | 6/1992 | Higuchi et al. | 528/59 |
| 5,158,922 | 10/1992 | Hinney et al. | 502/175 |
| 5,185,420 | 2/1993 | Smith et al. | 528/61 |
| 5,300,535 | 4/1994 | Takeyasu et al. | 521/137 |
| 5,340,902 | 8/1994 | Smith et al. | 528/61 |
| 5,470,813 | 11/1995 | Le-Khac | 502/175 |
| 5,482,908 | 1/1996 | Le-Khac | 502/156 |
| 5,496,496 | 3/1996 | Kajita et al. | 528/66 |
| 5,545,601 | 8/1996 | Le-Khac | 502/156 |
| 5,576,382 | 11/1996 | Seneker et al. | 524/591 |
| 5,648,447 | 7/1997 | Seneker et al. | 528/63 |
| 5,670,601 | 9/1997 | Allen et al. | 528/76 |
| 5,677,413 | 10/1997 | Barksby et al. | 528/65 |
| 5,691,441 | 11/1997 | Seneker et al. | 528/61 |
| 5,696,221 | 12/1997 | Barksby et al. | 528/64 |

OTHER PUBLICATIONS

J. W. Reisch et al., "Polyurethane Sealants and Cast Elastomers with Superior Physical Properties", 33$^{rd}$ Annual Polyurethane Marketing Conference Sep. 30,–Oct. 3, 1990, pp. 368–374.

C.P. Smith et al., "Thermoplastic Polyurethane Elastomers Made From High Molecular Weight Poly-L™ Polyols", Polyurethane World Congress 1991, Sep. 24–26, 1991, pp. 313–318.

*Primary Examiner*—Rabon Sergent
*Attorney, Agent, or Firm*—Dennis M. Kozak

[57] ABSTRACT

Elastomers exhibiting decreased demold times and improved green strength are prepared by reacting a di- or polyisocyanate with a monodisperse polyoxypropylene diol having ultra-low unsaturation, and preferably prepared by the double metal cyanide.t-butyl alcohol catalyzed polymerization of propylene oxide. Further improved demold times and elevated elastomer physical properties are made possible by the use of multidisperse polyoxyalkylene polyether polyol blends having an overall unsaturation of less than 0.010 meq/g and a polydispersity of about 1.4 or greater.

13 Claims, 2 Drawing Sheets

POLYURETHANE ELASTOMERS HAVING IMPROVED GREEN STRENGTH AND DEMOLD TIME, AND POLYOXYALKYLENE POLYOLS SUITABLE FOR THEIR PREPARATION

This is a division of application Ser. No. 08/491,007, filed Jun. 15, 1995 now U.S. Pat. No. 5,670,601.

TECHNICAL FIELD

The present invention pertains to polyurethane elastomers displaying improved green strength and lowered demold times. More particularly, the present invention pertains to such elastomers prepared from ultra-low unsaturation polyoxyalkylene polyols preferably prepared by polymerizing propylene oxide in the presence of double metal cyanide.t-butylalcohol (DMC.TBA) complex catalysts. The polyurethane elastomers exhibit dramatically improved green strength and diminished demold times as compared with otherwise similar elastomers prepared from polyols having low unsaturation, without diminishing ultimate physical properties of the elastomer. The present invention further pertains to unique ultra-low unsaturation polyoxypropylene polyol blends having broad molecular weight distribution or polydispersity which further reduce demold time and increase green strength of elastomers prepared therefrom.

BACKGROUND ART

Processing characteristics are critical in assessing the commercial viability of polyurethane elastomers. Examples of these processing characteristics are the pot life, gel time, demold time, and green strength, among others. A commercially useful pot life is necessary to enable sufficient working time to mix and degas where necessary, the reactive polyurethane forming components. Gel time is critical in enabling complete filling of molds before gelation occurs, particularly when large, complex molds are utilized, while demold time is important in maximizing part production. Too long a demold time necessitates larger numbers of relatively expensive molds for a given part output. Demold time is especially critical for glycol extended elastomers which tend to be slow curing. These requirements are often competing. For example, a decrease in catalyst level will generally result in longer pot life and increased gel time, but will often render demold time unsatisfactory, and vice versa.

Green strength is also important. Green strength is a partially subjective measure of the durability of a polyurethane part immediately following demold. The characteristics of the polyurethane forming reaction is such that full strength of the polyurethane part does not develop for a considerable time after casting. The partially cured, or "green" part must nevertheless be demolded within a reasonable time. Polyurethane parts typically display two types of "poor" green strength. One type is such that the part is gelled and rigid, but is brittle and easily torn. Those normally skilled in the art of polyurethane elastomers refer to this type of poor green strength as "cheesy" in reference to its "cheese-like", consistency. The other type of "poor" green strength is when the part is soft and pliable, and permanently distorts during the demolding process. By contrast, parts which upon demold display durability and which can be twisted or bent without permanent damage are said to possess "excellent" green strength. While demold time limits production, poor green strength increases scrap rate.

Various methods of increasing green strength and decreasing demold time have been examined. Increasing catalyst level, for example, may often desirably influence these properties. However, as previously stated, increased catalyst levels also decrease both pot life and gel time. Moreover, when microcellular elastomers are to be produced, some catalysts increase the isocyanate/water reaction to a greater degree than the isocyanate/polyol reaction, and thus can affect processability.

It is well known in the art that polyurea and polyurethane/urea elastomers are much easier to process than all urethane elastomers. Polyurea and polyurethane/urea elastomers are prepared using amine-terminated polyols and/or diamine chain extenders. The most common urethane/urea elastomer system uses a toluene diisocyanate prepolymer reacted with the diamine extender, methylene-bis-(2-chloroaniline), better known as MOCA or MBOCA. This system is known to give a long pot life (10 to 20 minutes) with commercially acceptable demold times of less than 60 minutes with excellent green strength. In addition to this, there is minimal sensitivity to changes in processing conditions with this system. However, some of the physical properties of the elastomers containing urea linkages are inferior compared to all urethane elastomers (i.e. softness, tear strength, resilience and hydrolysis resistance). Other common diamine chain extenders may unduly affect pot life and gel time, however.

Primary hydroxyl-containing polyols have also been used to decrease demold time and improve green strength with some success, particularly in RIM applications. However, in general, reliance on high primary hydroxyl polyols causes a decrease in pot life and gel time and moreover, may make the elastomers more subject to adsorption of water due to the more hydrophilic nature of the polyoxyethylene cap which provides the primary hydroxyl content. Elastomers based on primary hydroxyl polyols are also generally harder than those prepared from polyoxypropylene homopolymer polyols.

In U.S. Pat. No. 5,106,874 is disclosed the use of polyoxyethylene capped polyoxypropylene polyether polyols in diamine extended polyurethane/urea elastomers where the polyol is prepared using alkali metal catalysts and low temperatures to minimize polyol unsaturation. The '874 patentees indicate that when ethylene oxide capped polyols having an unsaturation of 0.04 meq/g polyol are used in the preparation of diamine extended elastomers, demold time and green strength improve. However, the systems disclosed are rigid polyurethane/urea elastomers with a high proportion of urea linkages only suitable for RIM, as demold times are on the order of 30–40 seconds.

Polyol unsaturation and its effect on polyurethane properties has been commented upon at great length, although the effects are unpredictable and difficult to quantify. The relationship of unsaturation to processing has not been studied to any great degree. During synthesis of polyoxypropylene polyols by base catalyzed oxypropylation of a suitable polyhydric initiator, a competing rearrangement produces monohydric allyloxy species which are in turn oxypropylated. The mechanism of unsaturation formation has been discussed, for example, in *Block and Graft Polymerization*, Vol. 2, Ceresa, Ed., John Wiley & Sons, pp. 17–21. Whatever the source of terminal unsaturation, it is well known that the mol percent of terminally unsaturated monol increaser rapidly with increasing molecular weight of the polyhydric species. Thus, while very low molecular weight, conventionally catalyzed, polyoxypropylene glycols of 200 Da to 500 Da equivalent weight may have low monol content, for example less than about 1 mol percent, a similarly prepared diol of 2000 equivalent weight may contain 45 mol percent to 50 mol percent of monol. This large increase in monol content lowers the nominal functionality of two to an average functionality of c.a. 1.6 or less.

Polyol unsaturation is generally measured by titration in accordance with ASTM test method D-2849-69 or its equivalent, and is expressed in milliequivalents of unsaturation per gram of polyol, hereinafter, "meq/g". Traditional, base-catalyzed polyols in the moderate to higher equivalent weight range, for example from 1000 Da to 2000 Da equivalent weight, generally have unsaturations in the range of 0.03 to about 0.095 meq/g.

To lower the unsaturation, and thus the monol content, various process parameters have been adjusted, such as the catalyst level and oxyalkylation temperature. However, improvement in the level of unsaturation in such cases comes at the expense of process time. Moreover, the improvement is at best marginal. Use of alternative catalyst systems, such as barium hydroxide, transparent iron oxides, diethyl zinc, metal phthalocyanines, and combinations of metal naphthenates and tertiary amines have also been proposed, the latter method being able to reduce unsaturation to the range of 0.03 to 0.04 meq/g in c.a. 4000 Da polyoxypropylene triols. However, even at this lower level, as compared to the 0.07 to 1.0 meq/g representative of conventionally catalyzed but otherwise similar polyols, the mol percent monol is still high, for example 25 mol percent or thereabouts.

Significant improvement in monol content of polyoxypropylene polyols has been achieved using double metal cyanide catalysts, for example the non-stoichio-metric zinc hexacyanocobaltate-glyme catalysts disclosed in U.S. Pat. No. 5,158,922. Through use of such catalysts, polyoxypropylene polyols of much higher molecular weight than previously thought possible have been prepared, for example 10,000 Da polyoxypropylene triols with unsaturations of 0.017 meq/g. J. W. Reish et al., "Polyurethane Sealants and Cast Elastomers With Superior Physical Properties", 33RD ANNUAL POLYURETHANE MARKETING CONFERENCE, Sep. 30–Oct. 3, 1990, pp. 368–374.

Numerous patents have addressed the use of higher molecular weight polyols to prepare polyurethanes. In such cases, the improvements are said to result either solely from the ability to provide higher molecular weight polyols of useful functionality, or additionally, the low monol content, the monol thought to react as "chain-stoppers" during polyurethane addition polymerization. Illustrative examples of such patents are U.S. Pat. No. 5,124,425 (room temperature cure sealants from high molecular weight polyols having less than 0.07 meq/g unsaturation); U.S. Pat. No. 5,100,997 (diamine extended polyurethane/urea elastomers from high molecular weight polyols having less than 0.06 meq/g unsaturation); U.S. Pat. No. 5,116,931 (thermoset elastomers from double metal cyanide catalyzed polyols having less than 0.04 meq/g unsaturation); U.S. Pat. No. 5,250,582 (high molecular weight DMC.glyme catalyzed polyols grafted with unsaturated polycarboxylic acids to provide in situ blowing agent); U.S. Pat. No. 5,100,922 (high molecular weight polyols, preferably DMC.glyme catalyzed, together with aromatic crosslinking agent useful in preparing integral skin foams); U.S. Pat. No. 5,300,535 (high molecular weight polyols with unsaturation less than 0.07 meq/g useful in preparing foams with low resonant frequencies for seating applications); and U.S. Pat. No. 4,239,879 (elastomers based on high equivalent weight polyols). However, none of these patents address processing characteristics, which are of paramount importance in the cast elastomer industry.

C. P. Smith et al., in "Thermoplastic Polyurethane Elastomers Made From High Molecular Weight Poly-L™ Polyols", POLYURETHANES WORLD CONGRESS 1991, Sep. 24–26, 1991, pp. 313–318, discloses thermoplastic elastomers (TPU) prepared from polyoxyethylene capped polyoxypropylene diols with unsaturation in the range of 0.014–0.018 meq/g. The polyols used were prepared using double metal cyanide.glyme catalysts, and the elastomers showed increased physical properties as compared to elastomers prepared from a conventionally catalyzed diol of 0.08 meq/g unsaturation. Additional examples of low unsaturation polyols in polyurethane elastomers is given in "Comparison of the Dynamic Properties of Polyurethane Elastomers Based on Low Unsaturation Polyoxypropylene Glycols and Poly(tetramethylene oxide) Glycols", A. T. Chen et al., POLYURETHANES WORLD CONGRESS 1993, Oct. 10–13, 1993, pp. 388–399. Cited as positively influencing elastomer physical properties were the low monol content and low polydispersity of the c.a. 0.015 meq/g, DMC.glyme catalyzed polyols used. Neither publication addresses processing characteristics, or the surprising effect that ultra-low unsaturation and broad polydispersity have on these characteristics.

It has been reported that low unsaturation polyols sometimes produce polyurethanes with anomalous properties. For example, the substitution of a low unsaturation 10,000 Da molecular weight triol for a 6000 Da molecular weight conventionally catalyzed triol produced an elastomer of higher Shore A hardness where one would expect a softer elastomer, whereas substitution of a similarly DMC.glyme catalyzed 6000 Da molecular weight triol for a conventional 6000 Da molecular weight triol showed no increase in hardness. R. L. Mascioli, "Urethane Applications for Novel High Molecular Weight Polyols", 32ND ANNUL POLYURETHANE TECHNICAL/MARKETING CONFERENCE, Oct. 1–4, 1989. Moreover, and as more fully set forth below, butanediol extended elastomers prepared from DMC.glyme catalyzed polyols exhibited demold times of 150 minutes or more, which is commercially unacceptable in cast elastomer applications.

In copending U.S. application Ser. No. 08/156,534, herein incorporated by reference, are disclosed novel double metal cyanide.t-butanol (DMC.TBA) catalysts prepared by intimate mixing of catalyst reactants. These catalysts lack the crystallinity characteristic of DMC.glyme catalysts as shown by X-ray diffraction studies, and moreover exhibit threefold to tenfold higher activity in propylene oxide polymerization. It is especially surprising that the unsaturation is lowered to unprecedented ultra-low values through use of these catalysts, with measured unsaturations of from 0.003 meq/g to 0.007 meq/g routinely achieved.

While the measurable unsaturation implies an exceptionally low but finite monol content, it is especially surprising that analysis of the product polyols by gel permeation chromatography showed no detectable low molecular weight fraction. The polyols are essentially monodisperse. The virtually complete absence of any low molecular weight species renders such polyols different in kind from even those prepared from DMC.glyme catalysts.

SUMMARY OF THE INVENTION

It is an object of the present invention to provide polyurethane elastomers with improved demold times and green strength.

It is a further object of the present invention to provide diol extended polyurethane elastomers which may be demolded in one hour or less.

It is a yet further object of the present invention to provide diol extended polyurethane elastomers which develop good green strength in one hour or less.

It is still a further object of the present invention to provide polyether polyol compositions which are uniquely adapted for preparing polyurethane elastomers with improved demold and/or green strength while retaining physical properties.

It has now been surprisingly discovered that a more than twofold reduction in polyurethane elastomer demold time may be achieved through the use of predominately polyoxypropylene polyether polyols having measured unsaturations of 0.010 meq/g polyol or less. It has further been surprisingly discovered that even further improvements in demold time are possible when the ultra-low unsaturation polyols have a polydispersity of 1.4 or greater.

It has further been discovered that microcellular elastomer formulations exhibit a surprising decrease in shrinkage when the majority of the polyether polyols used in their preparation are polyoxypropylene polyols having measured unsaturation of less than 0.010 meq/g.

DESCRIPTION OF PREFERRED EMBODIMENTS

Figure 1:
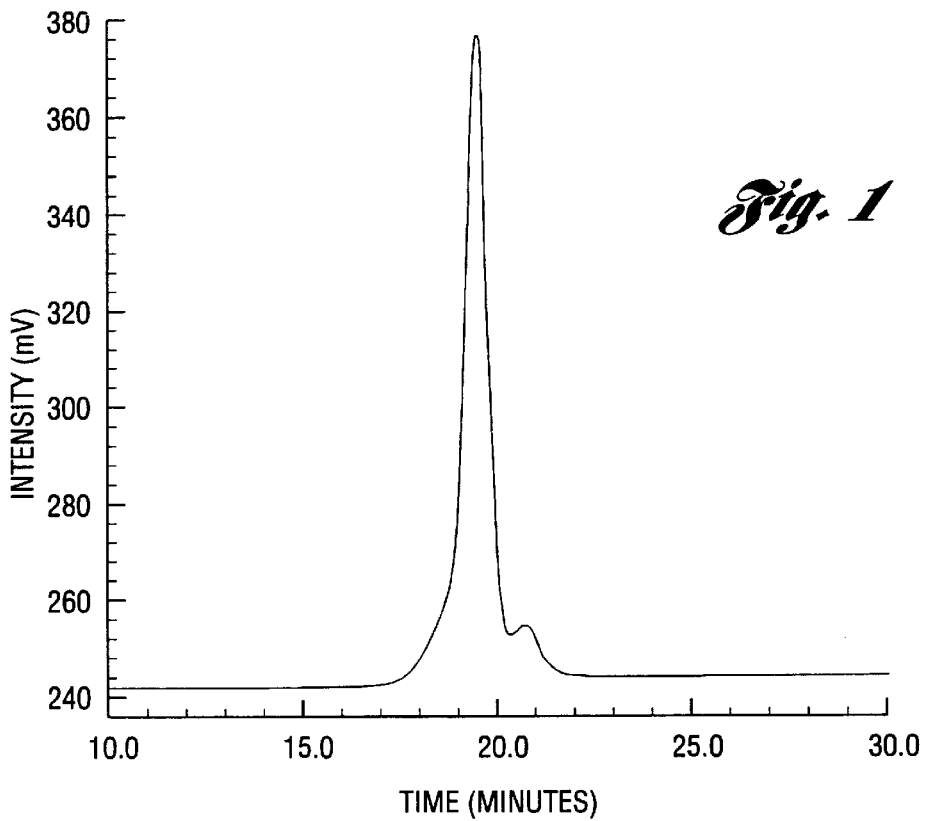
FIG. 1 is a gel permeation chromatography trace of a polyoxypropylene triol prepared in the presence of a DMC.glyme catalyst.

The polyurethane elastomers of the subject invention are prepared by the reaction of a di- or polyisocyanate, preferably a diisocyanate, with a polyoxyalkylene polyether polyol mixture by either the prepolymer, one-shot, or other techniques, using diols, or mixtures thereof as chain extenders. While the process of preparing polyurethane elastomers and the raw materials which have been used in the past are well known to those skilled in the art, reference may be had to the following material for purposes of basic reference.

By the term "polyurethane" is meant a polymer whose structure contains predominately urethane

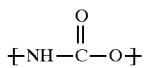

linkages between repeating units. Such linkages are formed by the addition reaction between an organic isocyanate group R—[—NCO] and an organic hydroxyl group [HO—]—R. In order to form a polymer, the organic isocyanate and hydroxyl group-containing compounds must be at least difunctional. However, as modernly understood, the term "polyurethane" is not limited to those polymers containing only urethane linkages, but includes polymers containing minor amounts of allophanate, biuret, carbodiimide, oxazolinyl, isocyanurate, uretidinedione, urea, and other linkages in addition to urethane. The reactions of isocyanates which lead to these types of linkages are summarized in the POLYURETHANE HANDBOOK, Gunter Vertel, Ed., Hanser Publishers, Munich, ®1985, in Chapter 2, p. 7–41; and in POLYURETHANES: CHEMISTRY AND TECHNOLOGY, J. H. Saunders and K. C. Frisch, Interscience Publishers, New York, 1963, Chapter III, pp. 63–118.

The urethane forming reaction is generally catalyzed. Catalysts useful are well known to those skilled in the art, and many examples may be found for example, in the POLYURETHANE HANDBOOK, Chapter 3, § 3.4.1 on pages 90–95; and in POLYURETHANE: CHEMISTRY AND TECHNOLOGY, in Chapter IV, pp. 129–217. Most commonly utilized catalysts are tertiary amines and organotin compounds, particularly dibutyltin diacetate and dibutyltin dilautrate. Combinations of catalysts are often useful also.

In the preparation of polyurethanes, the isocyanate is reacted with the active hydrogen-containing compound(s) in an isocyanate to active hydrogen ratio of from 0.5 to 1 to 10 to 1. The "index" of the composition is defined as the —NCO/active hydrogen ratio multiplied by 100. While the extremely large range described previously may be utilized, most polyurethane processes have indices of from 70 to about 120 or 130, more preferably from 95 to about 110, and most preferably from 100 to 105. In calculating the quantity of active hydrogens present, in general all active hydrogen containing compounds other than non-dissolving solids are taken into account. Thus, the total is inclusive of polyols, chain extenders, functional plasticizers, etc.

Hydroxyl group-containing compounds (polyols) useful in the preparation of polyurethanes are described in the POLYURETHANE HANDBOOK in Chapter 3, § 3.1, pages 42–61; and in POLYURETHANES: CHEMISTRY AND TECHNOLOGY in Chapter II, §§ III and IV, pages 32–47. Many hydroxyl-group containing compounds may be used, including simple aliphatic glycols, dihydroxy aromatics, particularly the bisphenols, and hydroxyl-terminated polyethers, polyesters, and polyacetals, among others. Extensive lists of suitable polyols may be found in the above references and in many patents, for example in columns 2 and 3 of U.S. Pat. No. 3,652,639; columns 2–6 of U.S. Pat. No. 4,421,872; and columns 4–6 of U.S. Pat. No. 4,310,632; these three patents being hereby incorporated by reference.

Preferably used are hydroxyl-terminated polyoxyalkylene and polyester polyols. The former are generally prepared by well known methods, for example by the base catalyzed addition of an alkylene oxide, preferably ethylene oxide (oxirane), propylene oxide (methyloxirane) or butylene oxide (ethyloxirane) onto an initiator molecule containing on the average two or more active hydrogens. Examples of preferred initiator molecules are dihydric initiators such as ethylene glycol, 1,6-hexanediol, hydroquinone, resorcinol, the bisphenols, aniline and other aromatic monoamines, aliphatic monoamines, and monoesters of glycerine; trihydric initiators such as glycerine, trimethylolpropane, trimethylolethane, N-alkylphenylenediamines, mono-, di-, and trialkanolamines; tetrahydric initiators such as ethylene diamine, propylenediamine, 2,4'-, 2,2'-, and 4,4'-methylenedianiline, toluenediamine, and pentaerythritol; pentahydric initiators such as diethylenetriamine and α-methylglucoside; and hexahydric and octahydric initiators such as sorbitol and sucrose.

Addition of alkylene oxide to the initiator molecules may take place simultaneously or sequentially when more than one alkylene oxide is used, resulting in block, random, and block-random polyoxyalkylene polyethers. The number of hydroxyl groups will generally be equal to the number of active hydrogens in the initiator molecule. Processes for preparing such polyethers are described both in the POLYURETHANE HANDBOOK and POLYURETHANES: CHEMISTRY AND TECHNOLOGY as well as in many patents, for example U.S. Pat. Nos. 1,922,451; 2,674,619; 1,922,459; 3,190,927; and 3,346,557. Preferable are polyether polyols having exceptionally low levels of unsaturation, prepared using double metal cyanide complex catalysts as described infra.

Polyester polyols also represent preferred polyurethane-forming reactants. Such polyesters are well known in the art and are prepared simply by polymerizing polycarboxylic acids or their derivatives, for example their acid chlorides or anhydrides, with a polyol. Numerous polycarboxylic acids are suitable, for example malonic acid, citric acid, succinic acid, glutaric acid, adipic acid, pimelic acid, azelaic acid, sebacic acid, maleic acid, fumaric acid, terephthalic acid, and phthalic acid. Numerous polyols are suitable, for example the various aliphatic glycols, trimethylolpropane and trimethylolethane, α-methylglucoside, and sorbitol. Also suitable are low molecular weight polyoxyalkylene glycols such as polyoxyethylene glycol, polyoxypropylene glycol, and block and random polyoxyethylene-polyoxypropylene glycols. These lists of dicarboxylic acids and polyols are illustrative only, and not limiting. An excess of polyol should be used to ensure hydroxyl termination, although carboxy groups are also reactive with isocyanates. Methods of preparation of such polyester polyols are given in the POLYURETHANE HANDBOOK and in POLYURETHANES: CHEMISTRY AND TECHNOLOGY.

Also suitable as the polyol are vinyl polymer modified polyols. Such polymer polyols are well known to the art, and are prepared by the in situ polymerization of one or more vinyl monomers, preferably acrylonitrile and/or styrene, in the presence of a polyether or polyester polyol, particularly polyols containing a minor amount of natural or induced unsaturation. Methods of preparing polymer polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. No. 4,524,157; 3,304,273; 3,383,351; 3,523,093; 3,953,393; 3,655,553; and 4,119,586, all of which patents are herein incorporated by reference.

Non-vinyl polymer modified polyols are also preferred, for example those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20μ, preferably less than 10μ.

Many isocyanates are useful in the preparation of urethanes. Examples of such isocyanates may be found in columns 8 and 9 of U.S. Pat. No. 4,690,956, herein incorporated by reference. The isocyanates preferred are the commercial isocyanates toluene diisocyanate (TDI) methylenediphenylene diisocyanate (MDI), and crude or polymeric MDI. Other isocyanates which may be useful include isophorone diisocyanate and dimethylxylylidene diisocyanate. Other isocyanates may be found in the POLYURETHANE HANDBOOK, Chapter 3, §3.2, pages 62–73 and POLYURETHANES: CHEMISTRY AND TECHNOLOGY, Chapter II, §II, pages 17–31.

Modified isocyanates are also useful. Such isocyanates are generally prepared through the reaction of a commercial isocyanate, for example TDI or MDI, with a low molecular weight diol or amine, polyoxyalkylene glycol, alkanolamine, or by the reaction of the isocyanates with themselves. In the former case, isocyanates containing urethane, biuret, or urea linkages are prepared, while in the latter case isocyanates containing allophanate, uretonimine, carbodiimide or isocyanurate linkages are formed.

Chain extenders may also be useful in the preparation of polyurethanes. Chain extenders are generally considered to be low molecular weight polyfunctional compounds or oligomers reactive with the isocyanate group. Aliphatic glycol chain extenders commonly used include ethylene glycol, diethylene glycol, propylene glycol, 1,4-butanediol, 1,6-hexanediol, hydroquinone bis(2-hydroxyethyl) ether (HQEE), cyclohexanedimethanol, and the like. Amine chain extenders include aliphatic monoamines but especially diamines such as ethylenediamine and in particular the aromatic diamines such as the toluenediamines and the alkylsubstituted (hindered) toluenediamines.

Other additives and auxiliaries are commonly used in polyurethanes. These additives include plasticizers, flow control agents, fillers, antioxidants, flame retardants, pigments, dyes, mold release agents, and the like. Many such additives and auxiliary materials are discussed in the POLYURETHANE HANDBOOK in Chapter 3, §3.4, pages 90–109 and in POLYURETHANES: CHEMISTRY AND TECHNOLOGY, Part II, Technology.

Microcellular elastomers contain an amount of blowing agent which is inversely proportional to the desired foam density. Blowing agents may be physical (inert) or reactive (chemical) blowing agents. Physical blowing agents are well known to those in the art and include a variety of saturated and unsaturated hydrocarbons having relatively low molecular weights and boiling points. Examples are butane, isobutane, pentane, isopentane, hexane, and heptane. Generally the boiling point is chosen such that the heat of the polyurethane-forming reaction will promote volatilization.

Until recently, the most commonly used physical blowing agents were the halocarbons, particularly the chlorofluorocarbons. Examples are methyl chloride, methylene chloride, trichlorofluoromethane, dichlorodifluoromethane, chlorotrifluoromethane, chlorodifluoromethane, the chlorinated and fluorinated ethanes, and the like. Brominated hydrocarbons may also be useful. Blowing agents are listed in the POLYURETHANE HANDBOOK on page 101. Current research is directed to lowering or eliminating the use of chlorofluorocarbons, and following the Montreal Protocol, great strides have been made to reduce or eliminate completely, the use of chlorofluorocarbon (CFC) blowing agents which exhibit high ozone depletion potential (ODP) and global warming potential (GWP). As a result, many new halogenated blowing agents have been offered commercially. A preferred group are, for example, the highly fluorinated alkanes and cycloalkanes (HFCs) and perfluorinated alkanes and cycloalkanes (PFCs).

Chemical blowing agents are generally low molecular weight species which react with isocyanates to generate carbon dioxide. Water is the only practical chemical blowing agent, producing carbon dioxide in a one-to-one mole ratio based on water added to the foam formulation. Unfortunately, completely water-blown foams have not proven successful in some applications such as rigid insulation and thus it is still common to use water in conjunction with a physical blowing agent in some cases. Polyurethane high resilience microcellular elastomers are typical all-water blown foams.

Blowing agents which are solids or liquids which decompose to produce gaseous byproducts at elevated temperatures can in theory be useful, but have not achieved commercial success. Air, nitrogen, argon, and carbon dioxide under pressure can also be used in theory, but have not proven commercially viable. Research in such areas continues, particularly in view of the trend away from chlorofluorocarbons.

Polyurethane microcellular elastomers generally require a surfactant to promote uniform cell sizes and prevent foam collapse. Such surfactants are well known to those skilled in the art, and are generally polysiloxanes or polyoxyalkylene polysiloxanes. Such surfactants are described, for example, in the POLYURETHANE HANDBOOK on pages 98–101. Commercial surfactants for these purposes are available from a number of sources, for example from Wacker Chemie, the Union Carbide Corporation, and the Dow-Corning Corporation.

Processes for the preparation of polyurethane microcellular elastomers and the equipment used therefore are well known to those in the art, and are described, for example, in the POLYURETHANE HANDBOOK in Chapter 4, pages 117–160 and in POLYURETHANES: CHEMISTRY AND TECHNOLOGY, Part II, Technology, in Chapter VIII, §§ III and IV on pages 7–116 and Chapter VIII, §§ III and IV on pages 201–238.

With reference to the subject invention, the isocyanates useful in the preparation of the subject elastomers may, in general, be any organic di- or polyisocyanate, whether aliphatic or aromatic. However, preferred isocyanates are the commercially available isocyanates toluene diisocyanate (TDI) and methylenediphenylene diisocyanate (MDI). Toluene diisocyanate is generally used as an 80:20 mixture of 2,4- and 2,6-TDI, although other mixtures such as the commercially available 65:35 mixture as well as the pure isomers are useful as well. Methylenediphenylene diisocyanate may also be used as a mixture of 2,4'-, 2,2'-, and 4,4'-MDI isomers. A wide variety of isomeric mixtures are commercially available. However, most preferable is 4,4'-MDI or this isomer containing only most minor amounts of the 2,4'- and 2,2'-isomers, as the latter may often affect physical properties in a manner not desirable for a particular product.

Preferred aliphatic isocyanates are the linear alkylene diisocyanates such as 1,6-diisocyanatohexane, 1,8-diisocyanatooctane, and linear diisocyanates having interspersed heteroatoms in the alkylene residue, such as bis(3-isocyanatopropyl)ether. More preferred aliphatic isocyanates are the various cycloaliphatic isocyanates such as those derived from hydrogenated aryldiamines such as toluene diamine and methylenedianiline. Examples are 1-methyl-2,4-diisocyanatocyclohexane and 1-methyl-2,6-diisocyanatocyclohexane; bis(4-isocyanatocyclohexyl)methane and isomers thereof; 1,2-, 1,3-, and 1,4-bis(2-(2-isocyanato)propyl)benzene; and isophorone diisocyanate.

Modified isocyanates based on TDI and MDI are also useful, and many are commercially available. To increase the storage stability of MDI, for example, small quantities, generally less than one mole of an aliphatic glycol or modest molecular weight polyoxyalkylene glycol or triol may be reacted with 2 moles of diisocyanate to form a urethane modified isocyanate.

Also suitable are the well known carbodiimide, allophanate, uretonimine, biuret, and urea modified isocyanates based on MDI or TDI. Mixtures of diisocyanates and modified diisocyanates may be used as well. In general, the isocyanate index of the overall formulation is adjusted to between 70 and 130, preferably 90 and 110, and most preferably about 100. Lower indexes generally result in softer products of lower tensile strength and other physical properties, while higher indexes generally result in harder elastomers which require oven cure or cure for long periods at ambient temperatures to develop their final physical properties. Use of isocyanate indexes appreciably above 130, for example 200–300 generally require addition of a trimerization catalyst and result in a crosslinked, less extensible elastomer having considerable polyisocyanurate linkages.

The chain extenders useful in the subject invention elastomers are preferably the aliphatic glycols and polyoxyalkylene glycols with molecular weights up to about 500 Da, preferably 300 Da. Aromatic dihydroxy compounds such as hydroquinone, the bisphenols, and 4,4'-dihydroxybiphenyl may be used as well. The chain extender may be a sole chain extender or mixture. Preferred are ethylene glycol, diethylene glycol, propylene glycol, 1,3-propanediol, 2-methyl-1, 3-propanediol, butylene glycol, 1,4-butanediol, 1,6-hexanediol, hydroquinone bis(2-hydroxyethyl)ether (HQEE), cyclohexanedimethanol (CHDM), 1,4-cyclohexanediol, and the like. Most preferred are ethylene glycol and in particular 1,4-butanediol and 1,6-hexanediol.

Amine chain extenders may also be used, preferably in minor amount. Examples are ethylene diamine and 1,6-hexanediamine, and diethylenetriamine among the aliphatic amine chain extenders. Suitable aromatic diamine chain extenders are the various toluenediamine isomers and their mixtures, the various methylenediphenylene diamines and their mixtures, and preferably the slower reacting aromatic diamines such as 4,4'-methylene bis(2-chloroaniline) (MOCA) and the sterically hindered alkyl substituted toluenediamines and methylenediphenylene diamines. Also suitable are the amino-terminated polyethers such as those available commercially as Jeffamine® polyethers. The amine extended elastomers generally exhibit a short demold time. However, in many industries, for example the automobile industry, where polyurethane/urea elastomers are injected into complex molds to prepare automobile parts such as fascias, further lowering the demold time and in particular increasing green strength is important due to the minimal number of very expensive molds utilized. Preferably, however, the subject elastomers are polyurethane elastomers prepared with chain extenders consisting essentially of diols.

In the subject invention elastomers, it is the polyether polyol component which is critical. Polyoxyalkylene polyether blends containing polyoxypropylene polyols with exceptionally low unsaturation must be used and must be prepared with this low level of unsaturation. The measured unsaturation (ASTM test method D-2849-69) must be less than 0.010 meq/g for the polyol blend. Furthermore, the individual polyols, regardless of the overall blend unsaturation, must have individual unsaturations of less than 0.015 meq/g. Preferred are polyol blends where the overall unsaturation is less than 0.007 meq/g and no individual polyol has an unsaturation greater than 0.010. Most preferred is the use of individual polyols in the blend where each polyol has a measured unsaturation of less than about 0.007 meq/g.

Thus, the major portion of the polyol blend, in order to have an overall unsaturation of less than 0.010 meq/g, must be an essentially monodisperse polyoxypropylene polyol which is preferably prepared by polymerizing propylene oxide onto an initiator molecule of suitable functionality in the presence of a substantially amorphous double metal cyanide.TBA catalyst such as those prepared as disclosed in copending U.S. application Ser. No. 08/156,534, which is herein incorporated by reference. Examples of catalyst preparation and polyol preparation are given in the Referential Examples herein.

Figure 2:
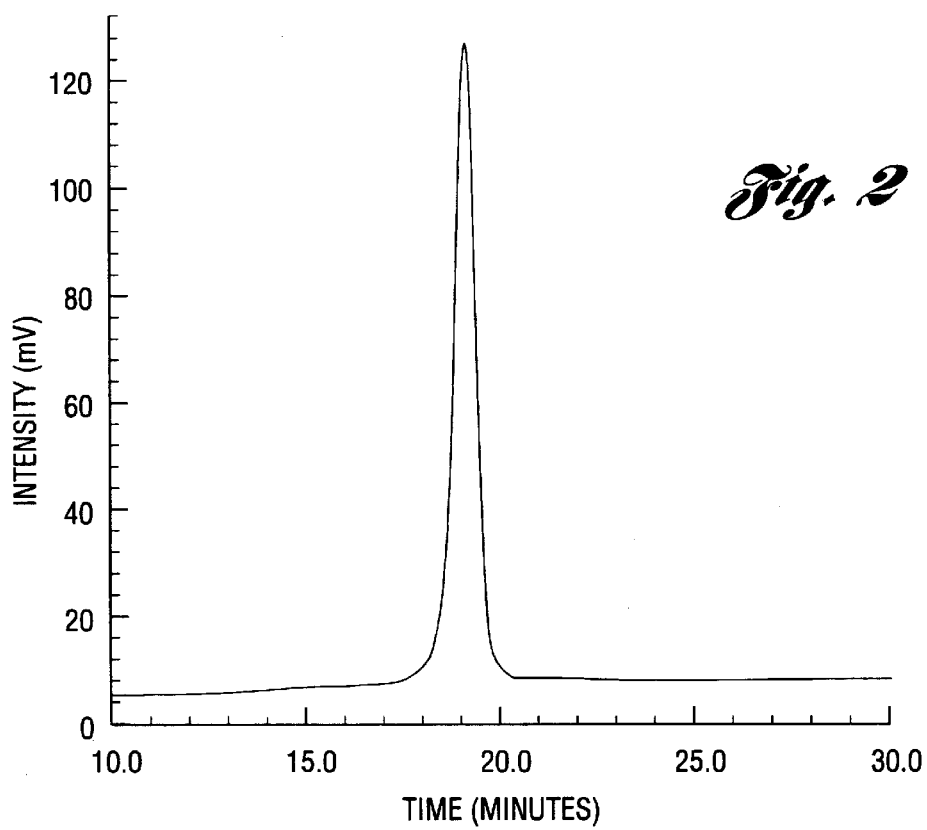
FIG. 2 is a gel permeation chromatography trace of a polyoxypropylene triol similar to that of FIG. 1, but prepared in the presence of DMC.TBA catalyst.

In FIG. 1 is shown a GPC trace of a "low unsaturation" polyoxypropylene triol prepared using a DMC.glyme catalyst as disclosed in U.S. Pat. No. 5,158,922. Even though the unsaturation is considerably lower than those disclosed, for example, by U.S. Pat. No. 5,106,874, notable is the low molecular weight peak centered at approximately 21 minutes. In FIG. 2 is illustrated an ultra-low unsaturation polyol prepared by the DMC.TBA catalyst as disclosed in U.S. application Ser. No. 08/156,534, and the Referential Examples of the present application. It is notable that this polyol is essentially monodisperse, i.e. there is no detectable low molecular weight component. Notable also is the symmetry of the GPC peak which does not show any appreciable tailing due to lower molecular weight components. This polyoxypropylene polyol has a measured unsaturation of only about 0.005 meq/g, however, the two polyols are otherwise analytically similar in terms of average molecular weight and functionality.

The polyol of FIG. 1 has a monol content of from 5–10 mol percent, as compared to conventional, base catalyzed polyols where the monol content for a polyol in this molecular weight range is commonly from 25–35 mol percent. It is not surprising, therefore, that the polyols of FIG. 1, with their higher average functionality and lower monol content, would respond differently than the conventionally catalyzed polyols of much higher monol content. However, it is highly surprising that the ultra-low unsaturation polyoxypropylene polyols of the subject invention would behave so differently from low unsaturation polyols having unsaturation in the range of 0.014 to 0.018 meq/g, as the monol content of these polyols is already very low. In particular, it was most surprising that elastomers prepared from the latter polyols exhibited demold times in excess of 150 minutes, while elastomers prepared from the subject ultra-low unsaturation polyols, in similar formulations, exhibited demold of 60 minutes or less, an improvement of 150%!

The polyether polyols useful in the subject invention are preferably prepared by polymerizing propylene oxide or a mixture of propylene oxide and another alkylene oxide having more than 2 carbon atoms, for example, 1,2-butylene oxide, 2,3-butylene oxide, oxetane, or tetrahydrofuran, onto a suitably functional initiator molecule, in the presence of a catalytically effective amount of a substantially amorphous double metal cyanide.TBA catalyst, preferably zinc hexacyanocobalt.TBA. Other synthetic methods which result in ultra-low unsaturations of less than 0.010 meq/g, preferably 0.007 meq/g or less are also suitable. By the term "polyoxypropylene polyol" and like terms is meant a polyol wherein the major portion of oxyalkylene groups are oxypropylene groups.

If a most minor amount of ethylene oxide, or if another alkylene oxide, for example, butylene oxide, is to be copolymerized with propylene oxide in random (heteric) fashion, the two alkylene oxides may simply be added simultaneously to the pressurized reactor. Surprisingly, this process cannot, at present, be utilized to provide polyoxyethylene capped polyoxypropylene homo or random copolymers, but rather, ethylene oxide desired to be added as a cap should be polymerized in the presence of an alternative catalyst, preferably an alkali metal hydroxide.

The amount of randomly copolymerized ethylene oxide should be most minor, i.e. from 0 to about 1% or thereabouts, as the polyol backbone should be substantially all polyoxypropylene or polyoxypropylene copolymerized with another alkylene oxide having more than two carbon atoms. Ethylene oxide derived moieties may be present as a cap when blends of polyols are utilized as described herein or in microcellular elastomers, and in such cases it is preferable that the weight percent of such cap be from 3 weight percent to about 30 weight percent, preferably 5 weight percent to 25 weight percent, and most preferably from about 10 weight percent to about 20 weight percent based on the weight of the finished polyol. For purposes of preparation of low water absorption elastomers, it is preferred that the total ethylene oxide content of the polyol, both external (cap) and any minor internal oxyethylene moieties, be less than 15 weight percent, more preferably less than 10 weight percent. Preferably, all propylene oxide-derived polyoxypropylene polyols are used.

Polyoxypropylene polyols, whether catalyzed by DMC.glyme or DMC.TBA catalysts, in general, have a very low, or narrow, polydispersity. The polydispersity of a polymer or polymer blend may be defined by the ratio of Mw/Mn where Mw is the weight average molecular weight and Mn is the number average molecular weight. The weight average molecular weight is defined as $Mw = \Sigma_i \omega_i M_i$ where $M_i$ is the ith molecular weight and $\omega_i$ is the weight fraction in the total of the ith molecular weight component. The number average molecular weight is defined as $\Sigma_i n_i M_i$ where $M_i$ is defined as above and $n_i$ is the number fraction of the total of the ith molecular weight component. For a theoretically perfect monodisperse polymer where all polymeric species have a single molecular weight, $M_w = M_n$ and the polydispersity $M_w/M_n = 1$. In practice, true monodispersity is never achieved, and in the subject application, polymers described as monodisperse have polydispersities close to 1, for example 1.20 or less, and preferably 1.10 or less. The molecular weights reported herein are number average molecular weights.

The term "multidisperse" as used herein indicates a bi- or trimodal, etc. distribution of molecular weights, with each individual distribution being essentially monodisperse. Such multidisperse blends are advantageously prepared by mixing two or more essentially monodisperse polyols, or by introduction of a second portion of the same or different initiator molecule into the polymerization in the presence of a DMC.TBA catalyst.

The polydispersities of a blend of two polyols can be calculated using the following equations:

$$Mw_{blend} = Mw_1 \alpha_1 + Mw_2 \alpha_2,$$

$$Mn_{blend} = Mn_1 Mn_2 / (Mn_1 \alpha_2 + Mn_2 \alpha_1)$$

$$Polydispersity_{blend} = Mw_{blend} / Mn_{blend},$$

where $Mw_1$ and $Mw_2$ are weight average molecular weights, $Mn_1$ and $Mw_2$ are number average molecular weights, and $\alpha_1$ and $\alpha_2$ are weight fractions of polyols 1 and 2, respectively.

The DMC.TBA catalyzed polyols prepared at normal catalyst levels, are very nearly truly monodisperse, with the molecular weights of the various molecules concentrated within a tight band with virtually no detectable lower molecular weight species. The polydispersity of such polyols is generally less than about 1.2. It has been surprisingly discovered that further improvements in demold time and green strength may be achieved if the polydispersity of the polyoxyalkylene polyol is greater than 1.4, while the level of unsaturation is maintained, as before, at less than 0.010 meq/g. This greater polydispersity may be accomplished in several ways.

If very low amounts of double metal cyanide catalysts are utilized in the propylene oxide polymerization, polyoxypropylene polyols may be obtained which, as is the case with normal levels of catalyst, have a level of unsaturation less than 0.010 meq/g, but which have a much broader molecular weight distribution than analogous polyols prepared at higher catalyst levels. These polyols are monomodal in the sense that they contain only a single, albeit broad, peak by GPC. However, their polydispersity, Mw/Mn is greater than 1.4, and preferably greater than 2.0. The latter polyols, having polydispersity greater than 2.0 while retaining very low unsaturation and a monomodal molecular weight distribution, are novel products.

A second, and preferred method of preparing ultra low unsaturation polyols with polydispersities greater than 1.4 is to blend two or more ultra-low unsaturation polyols with low polydispersity but different molecular weights, for example a blend of a 1000 Da diol with an 8000 Da diol, or a blend of a 2000 Da diol, 4000 Da diol, and 8000 Da diol. In such cases, the blends may be termed multidisperse, as they have a bimodal, trimodal, etc., molecular weight distribution. The polydispersity Mw/Mn of the blends are preferably greater than 1.4, and may suitably be greater than 1.8 or 2.0, or higher. Each of the individual polyols in the blend has a polydispersity preferably less than 1.2.

It is most surprising that such blends exhibit demold times much lower than a monodisperse polyol with low polydispersity. For example, a 2000 Da average molecular weight multidisperse polyoxypropylene diol derived elastomer where the diol component is a blend of monodisperse 1000 Da and 4000 Da diols exhibited a demold time of only 21 minutes, as compared to an otherwise similar elastomer containing a single, monodisperse 2000 Da diol which exhibited a demold time of 45 minutes. In addition, the elastomer containing the ultra-low unsaturation, multidisperse 2000 Da diol exhibited a surprising improvement in green strength. It is further highly surprising that a 4000 Da average molecular weight blend of a conventionally catalyzed 1000 Da polyoxypropylene diol having a conventional level of unsaturation with an ultra-low unsaturation polyol having a molecular weight of 8000 Da and an unsaturation of only 0.005 meq/g failed to provide any improvement in demold time compared to a straight 4000 Da ultra-low unsaturation polyol with unsaturation of 0.005 meq/g despite the fact that the blend had an average unsaturation of 0.007 meq/g, showing the importance of low unsaturation in both components and not merely the overall unsaturation of the blend. The elastomer from the blend of conventional diol and ultra-low unsaturation diol also displayed poor green strength relative to otherwise similar blends where both polyols have ultra-low unsaturation.

The polyol blends useful in the subject invention include polyoxyalkylene polyols having equivalent weights of from 400 Da to 10,000 Da or higher, preferably 400 Da to 8000 Da, and more preferably 500 Da to 8000, providing polyol components having average equivalent weights in the range of 1000 Da to 8000 Da. The ultra-low unsaturation polyols of the subject invention may have nominal (i.e. initiator) functionalities from 2 to 8, preferably 2 to 6, and most preferably 2 to 3. Diols or mixtures of diols and triols are preferred, particularly polydisperse blends of monodisperse diols, while in some formulations additions of minor portions of tetrols or hexols, for example, may lead to increases in desirable properties. Suitable initiators are well known to those skilled in the art, and include, for example, ethylene glycol, propylene glycol, 1,4-butanediol, glycerine, trimethylolpropane, pentaerythritol, α-methylglucoside, sorbitol, sucrose, ethylene diamine, propylene diamine, toluenediamine, diethylenetriamine, and the like. In preparing the ultra-low unsaturation polyols, the chosen initiator or initiator mixture is generally first oxyalkylated with a non-DMC catalyst to a low molecular weight polyoxyalkylene oligomer having an equivalent weight in the range of 200–400 Da, although lower and higher molecular weight oligomers may be used.

Preferably, the elastomers are prepared by the prepolymer process, however, the one shot process is useful as well. In the prepolymer process, the polyoxyalkylene polyol mixture is reacted with excess di- or polyisocyanate to form an isocyanate-terminated prepolymer containing from about 1% to about 25% by weight NCO groups, preferably from about 3% to about 12% NCO, more preferably about 4 to about 10% NCO, and most preferably about 6% NCO. Prepolymer preparation may be catalyzed, preferably by tin catalysts such as dibutyltin diacetate and dibutyltin dilaurate, in amounts of from 0.001 to about 5%, and more preferably 0.001 to about 1% by weight. The manufacture of prepolymers is within the level of skill in the art. If desired, the prepolymer polyol component may be augmented with hydroxyl-functional polyols other than polyoxyalkylene polyols, for example polyester polyols, polycaprolactone polyols, polytetramethylene ether glycols (PTMEG), and the like.

Following prepolymer formation, the prepolymer is then mixed with a proportion of one or more chain extenders such that the isocyanate index is in the desired range. The prepolymer and chain extender are thoroughly mixed, degassed if necessary, and introduced into the proper mold or, if thermoplastic polyurethanes are desired, reaction extruded and granulated or deposited on a moving belt and subsequently granulated.

Preferred chain extenders are the aliphatic and cycloaliphatic glycols and oligomeric polyoxyalkylene diols. Examples of suitable aliphatic glycol chain extenders are ethylene glycol, diethylene glycol, 1,2- and 1,3-propanediol, 2-methyl-1,3-propanediol, 1,2- and 1,4-butane diol, neopentyl glycol, 1,6-hexanediol, 1,4-cyclohexanediol, 1,4-cyclohexanedimethanol, hydroquinone bis(2-hydroxyethyl)ether, and polyoxyalkylene diols such as polyoxyethylene diols, polyoxypropylene diols, heteric and block polyoxyethylene/polyoxypropylene diols, polytetramethylene ether glycols, and the like, with molecular weights up to about 300 Da. Preferred are 1,6-hexanediol and 1,4-butanediol, the latter particularly preferred.

Diamine chain extenders, for example the amine-terminated polyoxyalkylene polyethers sold under the tradename Jeffamine™, and particularly the slower reacting deactivated or sterically hindered aromatic diamines such as 3,5-diethyltoluenediamine and 4,4'-methylenebis(2-chloroaniline) (MOCA) may be used, but generally only in most minor amounts. The advantageous effects of the subject polyol blends with diamine chain extenders is more difficult to quantify, as these systems are especially formulated for exceptionally short demold. Mixtures of aliphatic or cycloaliphatic diol chain extenders with diamine chain extenders may be used. When any significant amount of diamine is used, high pressure reaction injection molding techniques should be utilized.

The subject elastomers are highly suitable for microcellular elastomers, for example those suitable for use in shoe soles. The formulations of such elastomers contain a minor amount of reactive or volatile blowing agent, preferably the former. For example, a typical formulation will contain from about 0.1 to about 1.0 weight percent, preferably from about 0.2 to about 0.4 weight percent water. Isocyanate terminated prepolymers are generally utilized in such formulations, and have higher NCO content, in general, than the prepolymers used to form non-cellular elastomers. Isocyanate group contents of from 8 to 25 weight percent, more preferably 10 to 22 weight percent, and most preferably 13–15 weight percent are suitable. The formulations are generally crosslinked and diol extended, the crosslinking being provided by employing, in addition to the glycol chain extender, a tri- or higher functional, low unsaturation polyol in the B-side, optionally also with a low molecular weight crosslinker such as diethanolamine (DEOA). Alternatively, the isocyanate-terminated prepolymer may be prepared from a tri- or higher functional low unsaturation polyol or a mixture of di- and higher functional low unsaturation polyols, preferably mixtures containing minor amounts of polyoxyalkylene polyether polyols havig nominal functionalities of 3 or more and an unsaturation of less than 0.010 meq/g. All the polyols utilized in significant amount in the formulation, whether incorporated into prepolymer or in the B-side, should have unsaturations of 0.015 meq/g or less, preferably 0.010 meq/g or less, and the total average unsaturation of all polyol components on a molar basis should also be below 0.010 meq/g, preferably 0.007 meq/g or less. In addition to taking advantages of the shorter demold times and higher green strength, it is most surprising that the use of the subject polyols and polyol blends produces microcellular elastomers having sharply reduced shrinkage, a physical property of paramount importance in the polyurethane microcellular elastomer shoe sole industry.

Having generally described this invention, a further understanding can be obtained by reference to certain specific examples which are provided herein for purposes of illustration only and are not intended to be limiting unless otherwise specified.

REFERENTIAL EXAMPLE

Catalyst Preparation

Preparation of Zinc Hexacyanocobaltate Catalysts by Homogenization With Tert-butyl Alcohol as the Complexing Agent A double metal cyanide.TBA catalyst is prepared by the method disclosed in copending U.S. application Ser. No. 08/156,534.

Potassium hexacyanocobaltate (8.0 g) is added to deionized water (150 mL) in a beaker, and the mixture is blended with a homogenizer until the solids dissolve. In a second beaker, zinc chloride (20 g) is dissolved in deionized water (30 mL). The aqueous zinc chloride solution is combined with the solution of the cobalt salt using a homogenizer to intimately mix the solutions. Immediately after combining the solutions, a mixture of tert-butyl alcohol (100 mL) and deionized water (100 mL) is added slowly to the suspension of zinc hexacyanocobaltate, and the mixture is homogenized for 10 minutes. The solids are isolated by centrifugation, and are then homogenized for 10 minutes with 250 mL of a 70/30 (v:v) mixture of tert-butyl alcohol and deionized water. The solids are again isolated by centrifugation, and are finally homogenized for 10 minutes with 250 mL of tert-butyl alcohol. The catalyst is isolated by centrifugation, and is dried in a vacuum oven at 50° C. and 30 in. (Hg) to constant weight.

REFERENTIAL EXAMPLE

Polyether Polyol Synthesis: Effect of Catalyst on Polyol Unsaturation

Polyoxypropylene polyols are prepared using the catalyst of Referential Example 1.

A two-gallon stirred reactor is charged with a glycerine initiated polyoxypropylene triol (700 Da mol. wt.) starter (685 g) and zinc hexacyanocobaltate catalyst (DMC.TBA) (1.63 g) as prepared in the prior referential example. The mixture is stirred and heated to 105° C., and is stripped under vacuum to remove traces of water from the triol starter. Propylene oxide (102 g) is fed to the reactor, initially under a vacuum of 30 in. (Hg), and the reactor pressure is monitored carefully. Additional propylene oxide is not added until an accelerated pressure drop occurs in the reactor; the pressure drop is evidence that the catalyst has become activated. When catalyst activation is verified, the remaining propylene oxide (5713 g) is added gradually over about 2 h while maintaining a reactor pressure less than 40 psi. After propylene oxide addition is complete, the mixture is held at 105° C. until a constant pressure is observed. Residual unreacted monomer is then stripped under vacuum from the polyol product. The hot polyol product is filtered at 100° C. through a filter cartridge (0.45 to 1.2 microns) attached to the bottom of the reactor to remove the catalyst. The polyoxypropylene triol has a hydroxyl number of 27 and an unsaturation of only 0.005 meq/g. A similar triol prepared using a DMC.glyme catalyst of the prior art had a hydroxyl number of 27 and an unsaturation of 0.017 meq/g. A polyoxypropylene diol prepared from the DMC.TBA catalyst using a 450 Da polyoxypropylene glycol starter had a hydroxyl number of 14 and an unsaturation of 0.004 meq/g.

The polyol was subjected to GPC analysis. The GPC trace is illustrated in FIG. 2. The polyol is monodisperse with no detectable lower molecular weight components, while the DMC.glyme catalyzed polyol had a significant amount of such components.

EXAMPLES 1–2 AND COMPARATIVE EXAMPLES A–D

A series of 6% NCO terminated prepolymers were prepared from 2000 and 4000 Da diols prepared with either DMC.TBA catalyst (subject invention) or DMC.glyme catalysts (comparative). The measured unsaturation, demold times, and green strength, where applicable, are presented in Table 1 below. Green strength was not measured where demold times are greater than 150 minutes as such compositions are not commercially acceptable due to the long demold time. All formulations had a pot life of from 3–5 minutes. It is important, when comparing formulations, to compare formulations with similar pot life. The prepolymers were heated to 60° C. prior to adding chain extender, which was at room temperature. Dibutyltin dilaurate at 15 ppm was used as the urethane promoting catalyst.

TABLE 1

Processing Characteristics of Elastomers Made With Polyols Prepared With DMC Catalysts (6% NCO MDI Prepolymer/BDO Extended)

| Example | Polyol Catalyst | Polyol MW | Unsaturation (meq/gm) | Demold Time (minutes) | Green Strength |
|---|---|---|---|---|---|
| 1 | DMC·TBA | 2000 | 0.005 | 45 | fair |
| 2 | DMC·TBA | 4000 | 0.005 | 60 | fair |
| A | DMC·glyme | 2000 | 0.014 | >150 | n.d.* |
| B | DMC·glyme | 2000 | 0.013 | >150 | n.d.* |
| C | DMC·glyme | 4000 | 0.014 | >150 | n.d.* |
| D | DMC·glyme | 4000 | 0.010 | >150 | n.d.* |

*Not determined because sample could not be demolded within 150 minutes.

Table I clearly indicates the dramatic reduction in demold time when using ultra-low unsaturation polyoxypropylene homopolymer diols for use in polyurethane elastomers. Not even Comparative Example D yields an acceptable demold time despite having an unsaturation of 0.010 meq/g. Clearly, the unsaturation must be less than 0.010 meq/g when using a single polyoxypropylene polyol to prepare polyurethane elastomers having acceptable demold time.

TABLE 2

Elastomer Properties Using the 4000 MW Diols
Prepared With DMC Catalysts
(6% NCO MDI Prepolymer/BDO Extended)

| EXAMPLE | 1 | C | D |
|---|---|---|---|
| Polyol Unsaturation (meq/gm) | 0.005 | 0.014 | 0.010 |
| Prepolymer Viscosity (cps) @ 20° C. | 6380 | 5590 | 6670 |
| Prepolymer Viscosity (cps) @ 80° C. | 380 | 310 | 370 |
| Hardness (Shore A) | 71 | 61 (57)* | 65 (63)* |
| Rebound (%) | 68 | 60 | 64 |
| Elongation (%) | 953 | 607 | 878 |
| Tensile Strength (psi) | 3320 | 1180 | 1840 |
| 100% Modulus (psi) | 440 | 341 | 346 |
| 300% Modulus (psi) | 880 | 685 | 674 |
| Die C Tear Strength (pli) | 374 | 220 | 272 |

*Shore hardness needle penetrated slowly into the sample.

In Table 2 are presented the physical properties of the elastomers from Table 1 prepared from 4000 Da diols. Table 2 indicates that elastomers prepared from ultra-low unsaturation polyols have greatly improved properties as compared to those prepared from higher but still low unsaturation analogs. All the measured physical properties of elastomers prepared from ultra-low unsaturation diols having unsaturations less than 0.010 meq/g are significantly higher than the physical properties of elastomers prepared from polyols having low but higher unsaturation.

Figure 3:
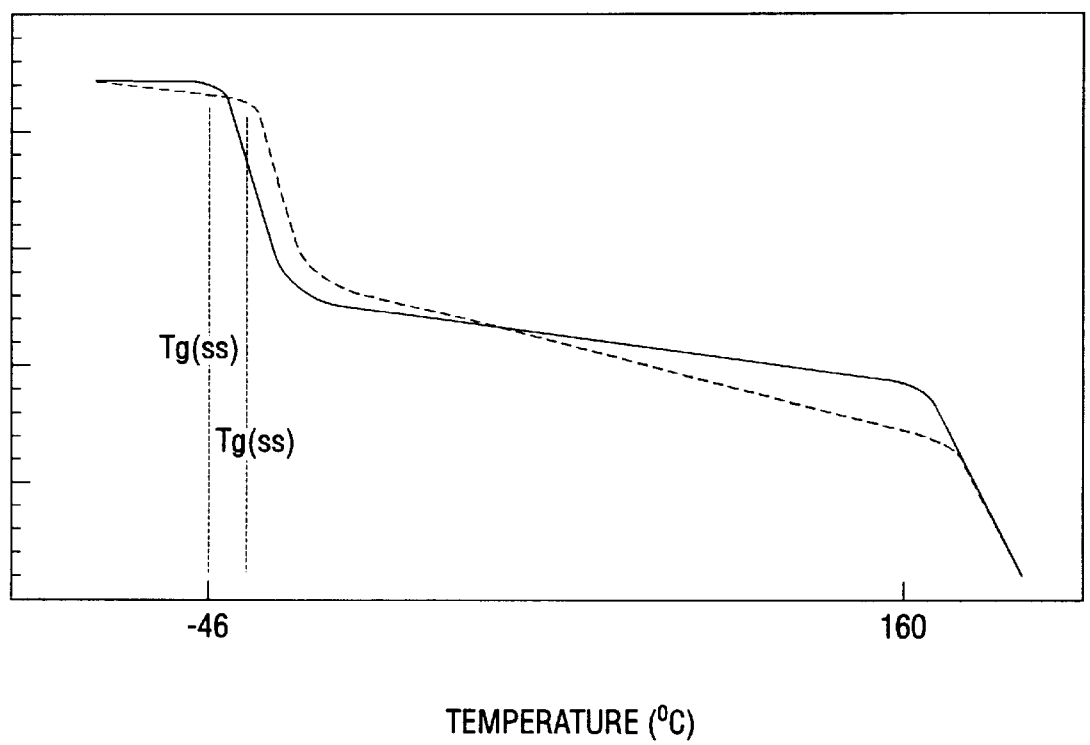
FIG. 3 contains plots of storage modulus against temperature of a polyurethane elastomer prepared from an ultra-low unsaturation polyol of the subject invention and an elastomer prepared from a low unsaturation polyol.

The elastomer of Example 2 and Comparative Example C were subjected to dynamic mechanical thermal analysis. As shown in FIG. 3, in the first curve, delineated by letters A–D, the storage modulus of an elastomer is high at low temperatures (A) due to the temperature being below the soft segment glass transition temperature $T_{g(SS)}$. As the elastomer temperature passes $T_{g(SS)}$, its rigid, glassy nature undergoes a transition to the rubbery state (B) and the storage modulus decreases rapidly, until a relatively flat plateau is reached. Elastomeric behavior is obtained in the region of the plateau (C), until the temperature reaches the melt temperature or softening temperature (D) of the hard segments $T_{m(HS)}$. At this point, the elastomer begins to soften and flow. While in theory the useful elastomeric range is between $T_{g(SS)}$ and $T_{m(HS)}$, in practice, it is limited to an upper temperature of approximately 80° C. Extension of the lower range by lowering $T_{g(SS)}$ results in an elastomer useable at lower temperature.

In the second curve is shown DMTA analysis of a second elastomer having a higher $T_{g(SS)}$ and a plateau which displays a steeper slope. The slope of the plateau determines how well a particular elastomer retains its physical properties with increasing temperature. In general, it is desired that an elastomer have the same degree of flexibility at low temperatures and high temperatures within its use range, for example.

A further important property is the loss modulus, which is a measure of the energy loss of the elastomer due to the flow character or component. The ratio of loss modulus to storage modulus is the loss tangent delta (Tan Delta) which is related to the elastomer's dynamic performance. The lower the loss tangent delta, the lower the heat buildup of the elastomer under dynamic stress. This property is particularly important in applications where the elastomer is continually flexed or compressed, for example in jounce bumpers of front wheel drive vehicles.

Table 3 illustrates the $T_{g(SS)}$, elastomeric plateau slope between 20° C. and 120° C., and the loss tangent delta of an ultra-low unsaturation (0.005 meq/g) polyol-derived elastomer and a similar polyol-derived elastomer prepared from a polyol having an unsaturation of c.a. 0.015 meq/g. As can be seen from the Table, the ultra-low unsaturation polyol-derived elastomer has a much lower slope in the region of the plateau, indicating a much slower drop off in physical properties as compared to an analogous elastomer prepared from a low but higher unsaturation polyol. The loss tangent delta of the subject invention elastomer is also much lower (less than half) of that of the comparative elastomer, lowering heat buildup substantially. Finally, the subject invention elastomer extends the low temperature elastomeric range by 2° C.

TABLE 3

Thermal and Dynamic Properties of Polyurethane
Elastomers Based on 4000 Da Diols
(6% MDI Prepolymers/BDO Cured)

| Polyol Unsaturation | $T_{g(SS)}$ (°C.) | 20° C./120° C. | Tan Delta @ 20°C. |
|---|---|---|---|
| 0.015 meq/g | −43 | 7.6 | 0.120 |
| 0.005 meq/g | −45 | 4.2 | 0.057 |

EXAMPLES 3 AND 4

Two similar 6% NCO prepolymers were prepared, both from ultra-low unsaturation polyoxypropylene diols, prepared as disclosed in the referential examples. In Example 3, a 2000 Da molecular weight, monodisperse diol was utilized, while in Example 4, a blend of 1000 Da and 4000 Da diols having an average molecular weight of 2000 Da were utilized. The prepolymers were chain extended with 1,4-butanediol as before. Example 3 showed a demold time of 45 minutes, a considerable improvement over elastomers prepared from polyols having unsaturation of 0.010 or higher where the demold time was greater than 150 minutes. Even more surprising was the improvement in green strength. Overall, the elastomer physical/mechanical properties were retained.

However, the 2000 Da molecular weight 1000 Da/4000 Da multidisperse blend surprisingly exhibited a demold time of only 21 minutes, less than half of the monodisperse diol. Moreover, elongation, tensile strength, and tear strength were markedly improved, with only the modulus properties being slightly lower. In addition, green strength was improved. The processing characteristics and physical properties are set forth in Table 4 below.

TABLE 4

Effect of Polyol Molecular Weight Distribution
on Elastomer Processing and Properties
(6% NCO MDI Prepolymer/BDO Extended: 105 Index)

| | Example 3 | Example 4 |
|---|---|---|
| Polyol Molecular Weight | 2000 | 2000 (1000/4000 Blend) |
| Dispersity | monodisperse | multidisperse |
| Polydispersity (Mw/Mn) | 1.05* | 1.72** |
| Unsaturation (meq/gm) | 0.005 | 0.005 |

TABLE 4-continued

Effect of Polyol Molecular Weight Distribution
on Elastomer Processing and Properties
(6% NCO MDI Prepolymer/BDO Extended: 105 Index)

|  | Example 3 | Example 4 |
|---|---|---|
| PROCESSING CHARACTERISTICS |  |  |
| Demold Time (minutes) | 45 | 21 |
| Green Strength | fair | good |
| PHYSICAL PROPERTIES |  |  |
| Hardness (Shore A) | 68 | 69 |
| Rebound (%) | 61 | 59 |
| Elongation (%) | 528 | 732 |
| Tensile Strength (psi) | 2060 | 2370 |
| 100% Modulus (psi) | 480 | 430 |
| 300% Modulus (psi) | 990 | 840 |
| Die C Tear Strength (pli) | 281 | 302 |

*Determined by gel permeation chromatography (GPC).
**Calculated based on GPC of individual components.

EXAMPLES 5–7 AND COMPARATIVE EXAMPLES E–G

A further series of elastomers were prepared as before, with the amount of dibutyltin dilaurate catalyst adjusted to give similar pot lives, necessary in order to compare elastomer processing. The average molecular weight of all polyols or polyol blends was 4000 Da. In Example 5, a monodisperse, ultra-low unsaturation 4000 Da diol was used, whereas in Examples 6 and 7, blends of ultra-low unsaturation 2000 Da and 8000 Da diols, and DMC.TBA catalyzed 1000 Da and 8000 Da diols were used, respectively. The total average unsaturation of both blends was 0.005 meq/g. In Comparative Example E, an 8000 Da ultra-low unsaturation (0.005 meq/g) diol was blended with a conventionally catalyzed 2000 Da polyoxypropylene diol with an unsaturation of 0.026 meq/g. This diol blend had an average unsaturation of 0.012 meq/g. In Comparative Example F, the same 8000 Da ultra-low unsaturation diol was blended with a conventionally catalyzed polyoxypropylene glycol of c.a. 1000 Da molecular weight (0.015 meq/g). The blend of Comparative Example F had an average unsaturation of only 0.007 meq/g due to the relatively small amount of low molecular weight polyoxypropylene diol present. In Comparative Example G, a blend similar to that of Comparative Example F was prepared, but the 8000 Da diol was a DMC.glyme catalyzed polyol. The average unsaturation of the blend was 0.015 meq/g. The processing parameters and physical properties are tabulated in Table 5 below.

TABLE 5

Effect Of 4000 MW PPG Diol Blends On The Elastomer Processing Parameters (6% MCO MDI Prepolymers; BDO Extended)

| EXAMPLE | 5 | 6 | 7 | E | F | G |
|---|---|---|---|---|---|---|
| Polyol Type | 4000 | 8000[1]/2000[1] | 8000[1]/1000[1] | 8000[1]/2000[2] | 8000[1]/1000[2] | 8000[1]/1000[2] |
| Polydispersity (Mw/Mn) | 1.15 | 1.71 | 2.06 | 1.73 | 1.90 | 1.90 |
| Average Unsaturation (meq/gm) | 0.005 | 0.005 | 0.005 | 0.012 | 0.007 | 0.015 |
| Polyol Viscosity @ 23° C., cps | 1,100 | 2,500 | 3,450 | n.d.* | n.d.* | n.d.* |
| ELASTOMER PROCESSING PARAMETERS |  |  |  |  |  |  |
| Prepolymer Viscosity @ 20° C., cps | 8,220 | 12,980 | 17,480 | n.d.* | n.d.* | n.d.* |
| Prepolymer Viscosity @ 80° C., cps | 400 | 580 | 790 | n.d.* | n.d.* | n.d.* |
| Pot Life, seconds | 124 | 124 | 124 | 94 | 110 | 88 |
| Demold Time, minutes | 22 | 19 | 12 | 14 | 22 | 30 |
| Green Strength @ Demold | poor | good | good | poor | poor | poor |
| Green Strength @ 60 minutes | average | excellent | excellent | good | good | poor |
| ELASTOMER PHYSICAL PROPERTIES |  |  |  |  |  |  |
| Hardness, Shore A | 71 | 68 | 71 | 70 | 70 | 66 |
| Resilience, % | 68 | 64 | 66 | 64 | 64 | 63 |
| Elongation, % | 903 | 867 | 890 | 908 | 943 | 540 |
| Tensile Strength, psi | 2960 | 2625 | 2764 | 1954 | 1901 | 1046 |
| 100% Modulus, psi | 472 | 466 | 486 | 446 | 419 | 428 |
| 300% Modulus, psi | 896 | 880 | 873 | 791 | 748 | 760 |
| Die C Tear Strength, pli | 362 | 349 | 366 | 311 | 315 | 287 |

[1]Ultra-low unsaturation, monodisperse polyoxypropylene diol of subject invention
[2]Conventionally base-catalyzed high unsaturation polyoxypropylene diol
[3]DMC · glyme catalyzed polyoxypropylene diol
*n.d. = not determined Table 5 illustrates that it is not merely the average overall unsaturation which is important, c.f. Comparative Example F, but that each significant polyol in the formulation must have a low degree of unsaturation in addition to the blend having a low average unsaturation. The table further indicates that physical properties of elastomers prepared from all ultra-low unsaturation polyols are greatly enhanced as well. Particularly noted in this respect are the tensile strength, 300% modulus, and Die C tear strengths.

In order to better quantify the green strength of these elastomers, the build in elastomer properties with time was measured while curing at 100° C. This was done by simply removing the elastomer samples from the oven and quickly measuring the Shore A hardness and resilience at 100° C. The property build was measured through the first two hours of cure. Surprisingly, the Shore A hardness and resilience increase much faster with the multidisperse, ultra-low unsaturation polyols of the subject invention than with the monodisperse, ultra-low unsaturation polyol. For example, the elastomer based on the 8000 Da/1000 Da blend achieved 95% of its final Shore A hardness and 86% of its final resilience after only 120 minutes versus 62% and 57%, respectively, for the monodisperse 4000 Da polyol.

A series of microcellular elastomers were prepared to demonstrate the unexpected improvement resulting from the use of the ultra-low unsaturation polyols of the present invention. Microcellular elastomers in accordance with the present invention are derived from a prepolymer component prepared using a substantial quantity of polyoxypropylene diol, preferably representing at least 20 weight percent of the total polyol, preferably greater than 30 weight percent, and most preferably about 50 weight percent. Prepolymers prepared from diols and triols are preferred.

EXAMPLE 8—COMPARATIVE EXAMPLES H AND I

Three microcellular elastomers suitable for use in shoe soles were made using prepolymer diols and triols. The prepolymers were prepared in a 2000 ml resin kettle equipped with a stirrer and nitrogen purge, into which 1199.4 g of the respective polyol and 0.04 g 85% phosphoric acid were added. Then, 515.2 g Mondur® M 4,4'-diphenylmethane diisocyanate was added and the mixture heated to 90° C. and stirred for c.a. 5 hours. The free NCO contents of the products were determined by titration to be between 8.2 and 8.5 weight percent. The polyols used in Comparative Example H were PPG 4025, a conventionally base catalyzed nominal 4000 Da polyoxypropylene diol and LHT-28, a 6000 Da average molecular weight, conventionally base catalyzed, glycerine initiated polyoxypropylene triol. The polyols used in Comparative Example I were a 4000 Da molecular weight DMC.glyme catalyzed polyoxypropylene diol and a 6000 Da molecular weight glycerine initiated polyoxypropylene triol, also DMC.glyme catalyzed. Both the latter polyols had unsaturations of c.a. 0.014–0.015 meq/g. The polyols used in Example 8 were similar to those of Comparative Example I, but both DMC.TBA catalyzed, with unsaturations of 0.005 meq/g and 0.007 meq/g, respectively. Both polyols were essentially monodisperse.

The microcellular shoe sole formulations used are presented in Table 6, below, in parts by weight.

TABLE 6

| COMPONENT | AMOUNT |
| --- | --- |
| Prepolymer diol | 67.9 |
| Prepolymer triol | 67.9 |
| Polymer Polyol[1] | 14.83 |
| Water | 0.61 |
| Niax ® A1 Catalyst | 0.1 |
| UL-1 Catalyst | 0.02 |
| Tegostab B4113 Surfactant | 0.1 |

[1]A polymer polyol prepared from a glycerine initiated polyoxypropylene triol conventionally base catalyzed, containing 43 weight percent of a styrene/acrylonitrile polymer dispersion and having a hydroxyl number of 20.2.

The properties of the microcellular elastomers are presented in Table 7.

TABLE 7

| EXAMPLE: | H | I | 8 |
| --- | --- | --- | --- |
| POLYOL IN PREPOLYMERS: | Conventional Base Catalyzed | DMC·Glyme Catalyzed | DMC·TBA Catalyzed |
| Density, g/cm$^3$ | 0.36 | 0.38 | 0.37 |
| Hardness, Shore A | 29 | 34 | 35 |
| Resiliency, % | 39 | 46 | 48 |
| Tear, Die C, lb/in. (N/m) | 44 (7705) | 49 (8581) | 52 (9106) |
| Compression Set, % | 18.2 | 8.8 | 5.8 |

The results presented in Table 7 illustrate that despite the analytical similarity of DMC.glyme and DMC.TBA catalyzed polyols, the essentially monodisperse, ultra-low unsaturation polyols produce microcellular elastomers with enhanced properties. The increase in resiliency and tear strength are both notable. However, the decrease in compression set is especially noteworthy. Compression set is one of the more important characteristics in microcellular elastomer shoe sole formulations. The low compression set obtained with ultra-low unsaturation polyols is 35% lower than even the DMC.glyme catalyzed polyol elastomers. Further, this low compression set has been found to be repeatable, and is expected to be lower still when polymer polyols employing ultra-low unsaturation base (carrier) polyols become available.

EXAMPLES 9–11 AND COMPARATIVE EXAMPLES J–L

In one-shot shoe sole formulations which do not employ prepolymers or do so only in minor amounts, the reactivity of the polyols must be increased in order to achieve satisfactory demold times, and thus polyoxyethylene capped polyoxypropylene polyols are utilized. Three one-shot, ultra-low density microcellular shoe sole formulations, 1,4-butanediol extended, and containing various amounts of Polyol A, a monodisperse, ultra-low unsaturation 4000 Da molecular weight polyoxypropylene diol with a 14.6 weight percent polyoxyethylene cap, a hydroxyl number of 28.3, and an unsaturation of only 0.005 meq/g, and Polyol B, a monodisperse, ultra-low unsaturation 6000 Da molecular weight glycerine initiated polyoxypropylene triol containing 14.7 weight percent polyoxyethylene as a cap, a hydroxyl number of 28.5 and an unsaturation of only 0.006 meq/g, were prepared, and their physical properties measured. For comparison purposes, similar formulations using conventionally catalyzed polyols C and D were used. Polyol C is a 4000 Da diol having a hydroxyl number of 28.5, a 20% weight percent oxyethylene cap, and an unsaturation of 0.06 meq/g, while Polyol D is a 6000 Da triol with a hydroxyl number of 28, a 15 weight percent oxyethylene cap and an unsaturation of 0.06 meq/g. Polyols C and D are available from the ARCO Chemical Company as ARCOL® 1025 and E785 polyols, respectively. The formulations and physical properties are presented in Table 8.

TABLE 8

| EXAMPLE | 9 | J | 10 | K | 11 | L |
| --- | --- | --- | --- | --- | --- | --- |
| 4,4-'MDI | 33.6 | 33.6 | 33.6 | 33.6 | 33.6 | 33.6 |
| Polyol A | 29.4 | | 47.0 | | 47.0 | |
| Polyol B | 29.4 | | 11.8 | | 11.8 | |
| Polyol C | | 29.4 | | 47.0 | | 47.0 |
| Polyol D | | 29.4 | | 11.8 | | 11.8 |

TABLE 8-continued

| EXAMPLE | 9 | J | 10 | K | 11 | L |
|---|---|---|---|---|---|---|
| 1,4-butanediol | 5.9 | 5.9 | 5.9 | 5.9 | 5.9 | 5.9 |
| Water | 0.60 | 0.60 | 0.60 | 0.60 | 0.60 | 0.60 |
| DABCO ® 33LV | 0.196 | 0.196 | 0.196 | 0.196 | 0.196 | 0.196 |
| POLYCAT. SA102 | 0.1 | 0.1 | 0.1 | 0.1 | 0.1 | 0.1 |
| NIAX ® A-1 | 0.1 | 0.1 | 0.1 | 0.1 | 0.1 | 0.1 |
| UL-1 | 0.004 | 0.004 | 0.004 | 0.004 | 0.004 | 0.004 |
| Surfactant | Y10515 | Y10515 | Y10515 | Y10515 | Y10788 | Y10788 |
| Density, g/cm$^3$ | 0.21 | 0.22 | 0.22 | 0.22 | 0.22 | 0.22 |
| Hardness, Asker C | 55 | 42 | 50 | 40 | 46 | 41 |
| Shrinkage, % | 0.5 | 4.9 | 0 | 14.2 | 18.5 | 30.7 |

Examples 9–11 and Comparative Examples J–L show that the one-shot microcellular elastomers prepared using polyol blends having ultra-low unsaturation less than 0.010 meq/g surprisingly exhibit considerably reduced shrinkage as compared to otherwise identical formulations employing a blend of conventionally catalyzed polyols. Reduced shrinkage is a property of paramount importance in microcellular elastomers, particularly those for use in shoe soles (i.e., mid-soles).

While the best mode for carrying out the invention has been described in detail, those familiar with the art to which this invention relates will recognize various alternative designs and embodiments for practicing the invention as defined by the following claims.

What is claimed is:

1. An isocyanate-terminated prepolymer prepared by reacting an excess of a di- or polyisocyanate with a polyoxyalkylene polyol component having an average equivalent weight of from about 1000 Da to about 8000 Da, a polydispersity of 1.4 or greater, and an unsaturation of less than 0.010 meq/g, wherein said polyoxyalkylene polyol component comprises a polyoxypropylene polyol.

2. The prepolymer of claim 1 wherein said polyoxypropylene polyol component is a polyoxypropylene diol.

3. The prepolymer of claim 2 wherein said polyoxypropylene polyol component comprises a multidisperse blend of individual polyoxypropylene diols having different molecular weights.

4. The prepolymer of claim 3 wherein each of said individual polyoxypropylene diols has an unsaturation of less than 0.010 meq/g.

5. The prepolymer of claim 3 wherein each of said individual polyoxypropylene diols has an unsaturation of less than 0.007 meq/g.

6. The prepolymer of claim 1 wherein the —NCO group content is from about 3 weight percent to about 15 weight percent based on the weight of the prepolymer.

7. The prepolymer of claim 1 wherein said polyoxypropylene polyol component is a blend of polyoxypropylene polyols, at least one of said polyoxypropylene polyols comprising a polyoxypropylene/polyoxyethylene polyol containing up to about 30 weight percent oxyethylene moieties based on the weight of said polyoxypropylene/polyoxyethylene polyol.

8. The prepolymer of claim 7 wherein at least a portion of said oxyethylene moieties are random, internal oxyethylene moieties.

9. The prepolymer of claim 4 wherein the —NCO group content is from about 3 weight percent to about 15 weight percent based on the weight of the prepolymer.

10. The prepolymer of claim 4 wherein said polyoxypropylene polyol component comprises at least one polyoxypropylene/polyoxyethylene diol containing up to about 30 weight percent oxyethylene moieties based on the weight of said polyoxypropylene/polyoxyethylene diol.

11. The prepolymer of claim 4 wherein at least a portion of said oxyethylene moieties are random, internal oxyethylene moieties.

12. The prepolymer of claim 1 wherein said polyoxypropylene polyol component comprises two or more individual polyoxypropylene diols, each of said individual polyoxypropylene diols having an unsaturation less than about 0.007 meq/g, an average equivalent weight of from 500 Da to about 10,000 Da, and a polydispersity of less than about 1.20.

13. The prepolymer of claim 1 wherein said polyoxypropylene polyol component comprises a minor amount of a polyoxyalkylene polyether polyol having a nominal functionality of 3 or more and an unsaturation of less than 0.010 meq/g.

* * * * *